US010164857B2

(12) United States Patent
Vance

(10) Patent No.: US 10,164,857 B2
(45) Date of Patent: Dec. 25, 2018

(54) SYSTEM AND METHOD FOR MACHINES TO COMMUNICATE OVER THE INTERNET

(71) Applicant: Eric P. Vance, Mesa, AZ (US)

(72) Inventor: Eric P. Vance, Mesa, AZ (US)

( * ) Notice: Subject to any disclaimer, the term of this patent is extended or adjusted under 35 U.S.C. 154(b) by 761 days.

(21) Appl. No.: 14/080,094

(22) Filed: Nov. 14, 2013

(65) Prior Publication Data

US 2015/0134726 A1    May 14, 2015

(51) Int. Cl.
*H04L 29/06* (2006.01)
*H04L 12/26* (2006.01)

(52) U.S. Cl.
CPC ............. *H04L 43/10* (2013.01); *H04L 29/06* (2013.01)

(58) Field of Classification Search
CPC ................................ H04L 43/10; H04L 29/06
See application file for complete search history.

(56) References Cited

U.S. PATENT DOCUMENTS

| | | | | |
|---|---|---|---|---|
| 5,651,006 A * | 7/1997 | Fujino | ................. | H04L 41/0213 370/408 |
| 5,872,847 A * | 2/1999 | Boyle | ..................... | H04L 29/06 380/283 |
| 5,968,116 A * | 10/1999 | Day, II | ................... | H04L 29/06 709/202 |
| 6,067,620 A * | 5/2000 | Holden | ............... | H04L 63/0218 713/155 |
| 6,507,869 B1 * | 1/2003 | Franke | .............. | H04L 29/12018 709/220 |
| 6,560,648 B1 * | 5/2003 | Dunn | .................. | H04L 12/2697 709/223 |
| 6,574,664 B1 * | 6/2003 | Liu | .................... | H04L 29/12009 709/224 |
| 6,742,028 B1 * | 5/2004 | Wang | ................ | G06F 17/30209 707/999.01 |
| 6,747,957 B1 * | 6/2004 | Pithawala | ........... | H04L 12/2697 370/252 |

(Continued)

FOREIGN PATENT DOCUMENTS

WO    WO 2008079686 A2 *    7/2008    ............. H04L 41/12

OTHER PUBLICATIONS

Iphelix, "researchhping" Aug. 13, 2008 ("iphelix").*

(Continued)

*Primary Examiner* — David R Lazaro
*Assistant Examiner* — Robert A Shaw
(74) *Attorney, Agent, or Firm* — Steven N. Fox, Esq.

(57) ABSTRACT

A system comprising a plurality of client machines in communication with a server machine over the internet. Each client machine comprises a Client Software Module. The Client Software Module comprises code to send an ABC Request comprising an ICMP Echo type, an unique identifier, and a timeout period T1. The server machine comprises a Server Software Module and an Unique Identifier Database. The Server Software Module comprises first code to receive the ABC Request from the client machine and second code to determine if the unique identifier is in the Database. The Server Software Module comprises third code to hold the ABC Request if the unique identifier is not in the Database. The Server Software Module comprises fourth code to create a an ABC Reply if the unique identifier is in the Database and fifth code to send the ABC Reply to the client machine.

14 Claims, 3 Drawing Sheets

(56) References Cited

U.S. PATENT DOCUMENTS

| | | | | |
|---|---|---|---|---|
| 7,073,198 | B1* | 7/2006 | Flowers | H04L 63/1433 713/151 |
| 7,395,324 | B1* | 7/2008 | Murphy | G06F 17/30067 707/E17.01 |
| 7,773,540 | B1* | 8/2010 | Zatko | H04L 63/0281 370/254 |
| 9,298,445 | B1* | 3/2016 | Chirhart | G06F 8/65 |
| 2001/0056486 | A1* | 12/2001 | Kosaka | H04L 43/00 709/224 |
| 2002/0056047 | A1* | 5/2002 | Lehman | G06F 11/3656 726/26 |
| 2002/0062450 | A1* | 5/2002 | Carlson | H04L 12/2801 726/26 |
| 2002/0065921 | A1* | 5/2002 | Davidson | H04L 29/06 709/227 |
| 2002/0120737 | A1* | 8/2002 | Martin | H04L 41/0213 709/224 |
| 2004/0003389 | A1* | 1/2004 | Reynar | G06F 8/65 717/178 |
| 2004/0044740 | A1* | 3/2004 | Cudd | G06F 17/30902 709/217 |
| 2004/0076152 | A1* | 4/2004 | Kimura | H04L 29/12216 370/389 |
| 2004/0083286 | A1* | 4/2004 | Holden | G06F 21/31 709/225 |
| 2004/0193943 | A1* | 9/2004 | Angelino | H04L 63/1408 714/4.1 |
| 2004/0233866 | A1* | 11/2004 | Bossoli | H04W 36/0033 370/328 |
| 2005/0005093 | A1* | 1/2005 | Bartels | G06F 21/606 713/150 |
| 2005/0171720 | A1* | 8/2005 | Olson | H04W 12/12 702/121 |
| 2006/0015580 | A1* | 1/2006 | Gabriel | H04N 7/17309 709/219 |
| 2006/0037069 | A1* | 2/2006 | Fisher | H04L 67/02 726/11 |
| 2006/0047823 | A1* | 3/2006 | Cheng | G06F 21/33 709/229 |
| 2006/0073820 | A1* | 4/2006 | Craswell | G06F 8/65 455/419 |
| 2006/0161662 | A1* | 7/2006 | Ng | H04L 12/2823 709/227 |
| 2006/0277590 | A1* | 12/2006 | Limont | H04L 67/1095 726/1 |
| 2007/0234428 | A1* | 10/2007 | Rash | G06F 21/552 726/25 |
| 2007/0266120 | A1* | 11/2007 | Tallieu | G06F 9/4416 709/220 |
| 2008/0016206 | A1* | 1/2008 | Ma | H04L 43/0817 709/224 |
| 2008/0049607 | A1* | 2/2008 | Xu | H04L 12/24 370/216 |
| 2008/0075048 | A1* | 3/2008 | Suszko | H04W 76/046 370/338 |
| 2008/0137543 | A1* | 6/2008 | Mitra | H04L 43/50 370/242 |
| 2008/0216153 | A1* | 9/2008 | Aaltonen | G06F 21/31 726/3 |
| 2008/0301219 | A1* | 12/2008 | Thornburgh | H04L 67/1008 709/203 |
| 2008/0313347 | A1* | 12/2008 | Kasturi | H04L 69/16 709/237 |
| 2008/0316960 | A1* | 12/2008 | Daigle | H04L 12/2876 370/329 |
| 2009/0172658 | A1* | 7/2009 | Wood | G06F 8/61 717/174 |
| 2009/0177782 | A1* | 7/2009 | Blatherwick | H04L 29/06 709/228 |
| 2009/0199175 | A1* | 8/2009 | Keller | G06F 8/61 717/178 |
| 2010/0088396 | A1* | 4/2010 | Armerding | H04L 63/029 709/218 |
| 2010/0325626 | A1* | 12/2010 | Greschler | G06F 9/44526 717/176 |
| 2011/0058499 | A1* | 3/2011 | Zhang | H04L 45/00 370/254 |
| 2011/0145273 | A1* | 6/2011 | Kolathaya | H04L 63/08 707/769 |
| 2011/0185013 | A1* | 7/2011 | Obata | G06F 8/61 709/203 |
| 2011/0280255 | A1* | 11/2011 | DeSanti | H04L 29/12801 370/419 |
| 2011/0298596 | A1* | 12/2011 | Warrick | G06F 21/305 340/12.53 |
| 2013/0024552 | A1* | 1/2013 | Libert | H04L 41/0893 709/220 |
| 2013/0039364 | A1* | 2/2013 | Pankratov | H04L 29/12528 370/389 |
| 2013/0139223 | A1* | 5/2013 | Woodman | G06F 21/42 726/4 |
| 2013/0148573 | A1* | 6/2013 | Boland | H04W 8/005 370/328 |
| 2014/0282413 | A1* | 9/2014 | Grimme | G06F 8/60 717/124 |

OTHER PUBLICATIONS

Tan, SANS: Intrusion Detection FAQ: How can attacker use ICMP for reconnaissance? (Jul. 6, 2012) retrieved from http://www.sans.org/security-resources/idfaq/icmp_misuse.php.*

* cited by examiner

SYSTEM AND METHOD FOR MACHINES TO COMMUNICATE OVER THE INTERNET

BACKGROUND OF THE INVENTION

Maintaining a large network of server and client machines is a daunting task, For example, consider a company having 500 Linux based bar-code scanning devices (client machines) used at various locations around the world. A technician is responsible for monitoring the output of the client machines. The technician sees that a specific client machine is causing errors in the system and would like to connect to that client machine. However, the technician cannot initiate a connection to the client machine because it is within a network with fire-walls preventing the connection. Using conventional systems and methods, the technician could maintain an open connection between all the client machines (500 or more) and the server but this would take bandwidth and system resources. Alternatively, a conventional ICMP request could be sent but that would either cause each client machine to constantly ping the server machine or there would be a delay in the connection. Still alternatively, an http request could be used to poll the server machine but that would also increase the bandwidth use and resources.

SUMMARY OF THE INVENTION

One object of the present invention is to provide a system and method for one machine such as a server machine to selectively send messages to other machines such as client machines over the internet that requires significantly less infrastructure, bandwidth and system resources.

The present invention is directed to a system and method for machines to communicate over the Internet. In a first embodiment, the system comprises a plurality of client machines in communication with a server machine over the Internet. Each client machine comprises a central processing unit, a storage device, and a Client Software Module. The Client Software Module comprises a first set of code adapted to create an ABC Request having an Unique Identifier corresponding to a specific client machine and a time out period T1. The Client Software Module further comprises a second set of code adapted to send the ABC Request to the server machine. The server machine comprises a central processing unit, a storage device, a Server Software Module, and an Unique Identifier Database. The Server Software Module comprises a first set of code adapted to receive the ABC Request from the client machine and a second set of code adapted to determine whether the Unique Identifier of the ABC Request is in the Unique Identifier Database. The Server Software Module comprises a third set of code adapted to hold the ABC Request a period of time T2 if the unique identifier is not in the Unique Identifier Database. The Server Software Module comprises a fourth set of code adapted to create an ABC Reply for the client machine if the unique identifier of the ABC Request is in the Unique Identifier Data Base. The ABC Reply comprises a command to the client machine such as connect to the server machine or download an update. The Server Software Module comprises a fifth set of code adapted to send the ABC Reply to the client machine. The system and method of the present invention allows a person or company to send a command to a specific client machine or group of machines without requiring significant infrastructure, bandwidth and/or other system resources.

BRIEF DESCRIPTION OF THE DRAWINGS

The following description of the invention will be more fully understood with reference to the accompanying drawings in which.

DESCRIPTION OF THE INVENTION

Figure 1:
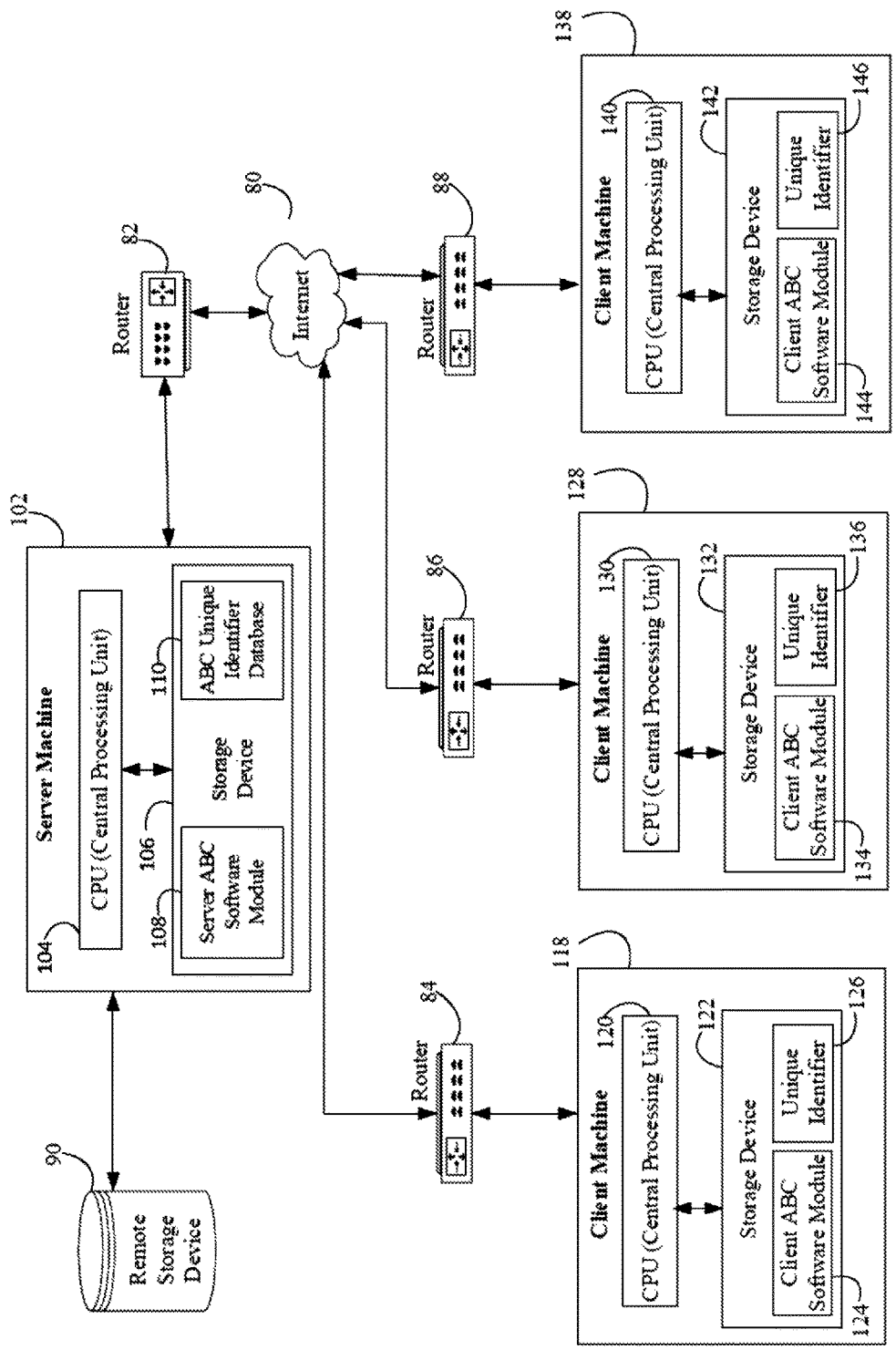
FIG. 1 is a high level block diagram showing the architecture of a system according to the present invention.

Referring to FIG. 1, a system 100 according to a first embodiment of the present invention generally comprises a machine 102 adapted to communicate with machines 118, 128, and 138 over an Internet or World Wide Web 80. The term "machine" includes any type of present or future developed server and/or client machine. The term "server machine" means any type of present or future developed electronic device having a central processing unit and server software, including but not limited to, a web server, a file server, an embedded server, and a plug based server. The term "client machine" means any type of present or future developed electronic machine having a central processing unit and client software, including but not limited to, a personal computer, a wireless device such as a phone, a work station, a mp3 player, a home automation device, a medical device and a network router. In the embodiment shown, except for Server Software Module 108 (to be described), machine 102 is a conventional web server machine such as Model No. PowerEdge T20 available from Dell Inc. In the embodiment shown, except for Client Software Module 124 (to be described), machines 118, 128 and 138 are conventional client machines such as Model No. RASPBERRY-MODA-256M—MODEL A available from Raspberry Pi (Trading) Ltd.

Server machine 102 generally comprises a central processing unit 104 and a storage device 106. Server machine 102 further comprises a Server Software Module 108 stored on storage device 106. Server machine 102 further comprises an Unique Identifier Data Base 110 stored on storage device 106 or a remote storage device 90. The Unique Identifier Database is adapted to receive and store authorized unique identifiers (for example, unique identifiers 326, 336, 346 and 356 shown in FIGS. 3 and 4) input by a technician at a designated time. Server machine 102 communicates over Internet 80 via a conventional router 82.

Client machine 118 generally comprises a central processing unit 120 and a storage device 122. Client machine 118 further comprises a Client Software Module 124 and an unique identifier 126 stored on storage device 122. Client machine 118 communicates over Internet 80 via a conventional router 84.

Client machine 128 generally comprises a central processing unit 130 and a storage device 132. Client machine 128 further comprises a Client Software Module 134 and an unique identifier 136 stored on storage device 132. Client machine 128 communicates over Internet 80 via a conventional router 86.

Client machine 138 generally comprises a central processing unit 140 and a storage device 142. Client machine 138 further comprises a Client Software Module 144 and an unique identifier 146 stored on storage device 142. Client machine 138 communicates over internet 80 via a conventional router 88.

Figure 2:
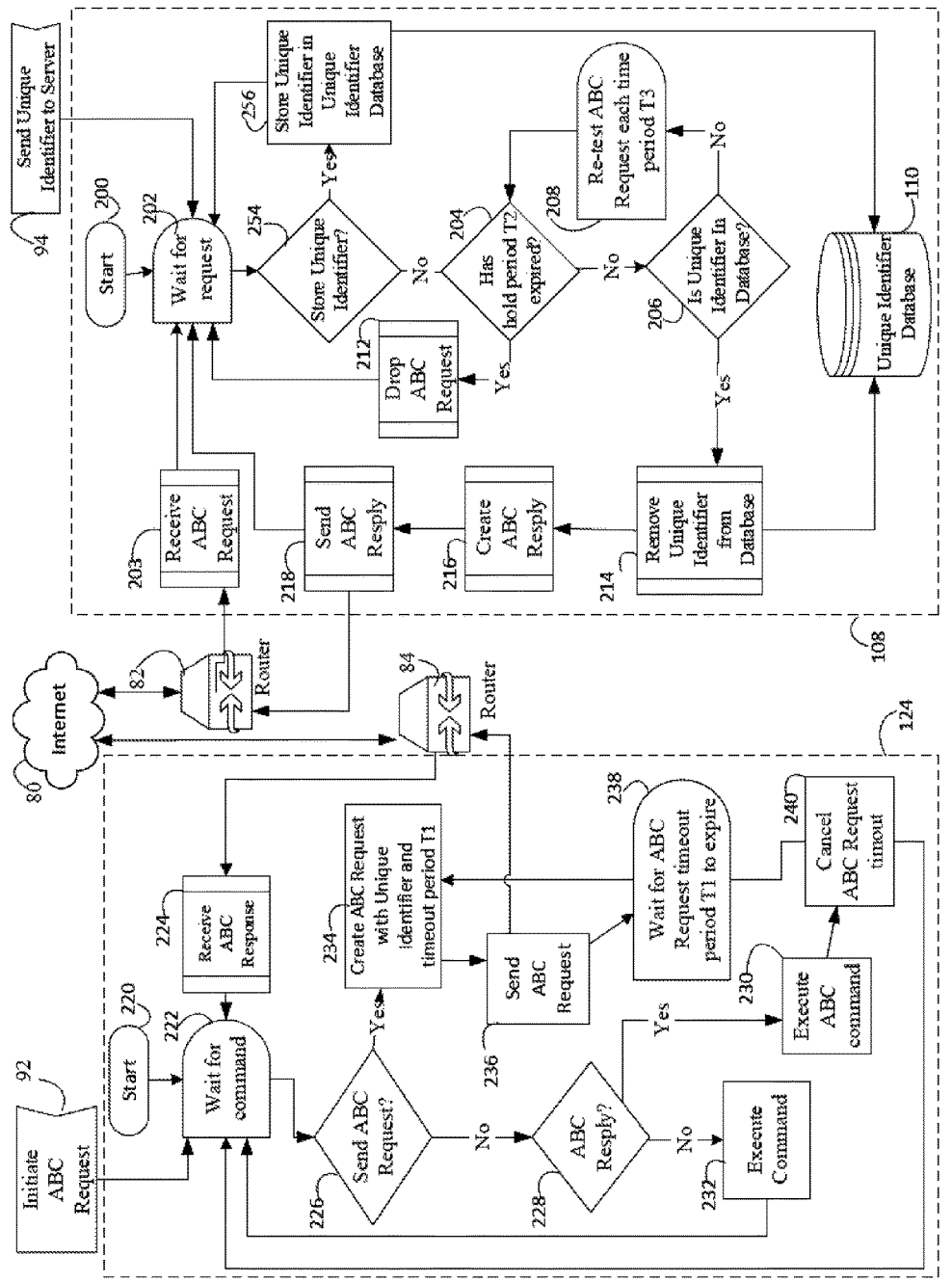
FIG. 2 is a high level flow chart showing the operation of a Client Software Module and a Server Software Module according to the present invention.

Referring to FIG. 2, where the method and operation of Server Software Module 108 of server machine 102 and Client Software Module 124 of client machine 118 are illustrated. Client Software Modules 134 and 144 are identical to Client Software Module 124.

Figure 4:
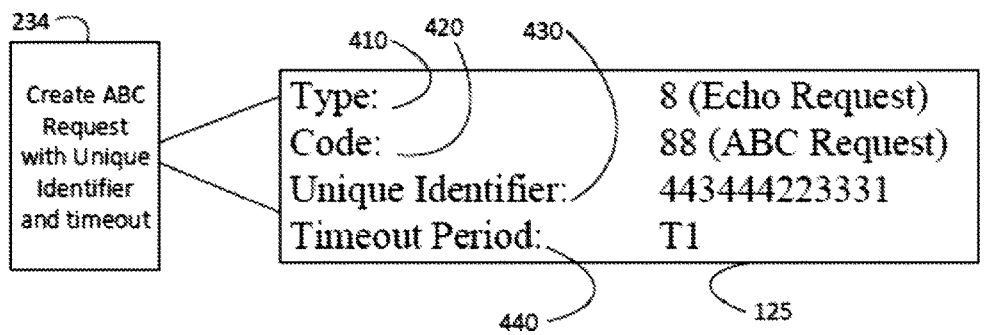
FIG. 4 is an illustration of an ABC Request according to the present invention.

As indicated by block 220, Client Software Module 124 of client machine 118 comprises a set of code adapted to start operation of the software. Control is passed to block 222 where Client Software Module 124 comprises a set of code adapted to wait for a message such as a command to initiate an ABC Request (to be described) received from an external source 92 or an ABC Reply (to be described) received from server machine 102. Control is passed to a decisional block 226, where Client Software Module 124 comprises code adapted to determine whether the message is to send an ABC Request. If the message to client machine 118 is to create an ABC Request then control is passed to a block 234 where Client Software Module 124 comprises code adapted to create an ABC Request 125 (FIG. 4). As shown by FIG. 4, ABC Request 125 is a ICMP Echo Request comprising a Type 410 equal to 8 (Echo Request), and a Code 420 equal to 88 (indicating an ABC Request). The Code can have any unique value in the range of 1-255 (8 bit value), for example 41, to denote that it is an ABC request (an unique echo request type). A Code having a value of 0 does not work as this is a conventional echo type request. ABC Request 125 further comprises a payload containing an unique identifier 430 and a time out period 440 designated T1. Control is passed to a block 236 where Client Software Module 124 comprises code adapted to send ABC Request 125 to server machine 102. Software module begins a wait for the ABC Request for time period T1 in block 238. Control is returned to block 222 where client machine 118 waits for another message. Returning to decisional block 226, if the message is not to send an ABC Request then control passes to a decisional block 228 where Client Software Module 124 comprises code adapted to determine whether the message is an ABC Reply. If the message is an ABC Reply 115 (FIG. 5) received by block 224 then control is passed to a block 230 where a command 530 (FIG. 5) of an ABC Reply 115 (FIG. 5) is executed by client machine 118. Command is then passed back to block 240 where Client Software Module 124 comprises code adapted to cancel the wait for ABC Request timeout period T1 in block 238. Command is then passed back to block 222 to wait for another message. Returning to decisional block 228, if the message is not an ABC Reply then control is passed to a block 232 where the command in the message is executed. Command is then passed back to block 222 to wait for another message. Returning to block 238 if the Wait for the ABC Request timeout period t1 expires control is passed back to block 234 where Client Software Module 124 comprises code adapted to create an ABC Request 125 (FIG. 4).

Figure 3:
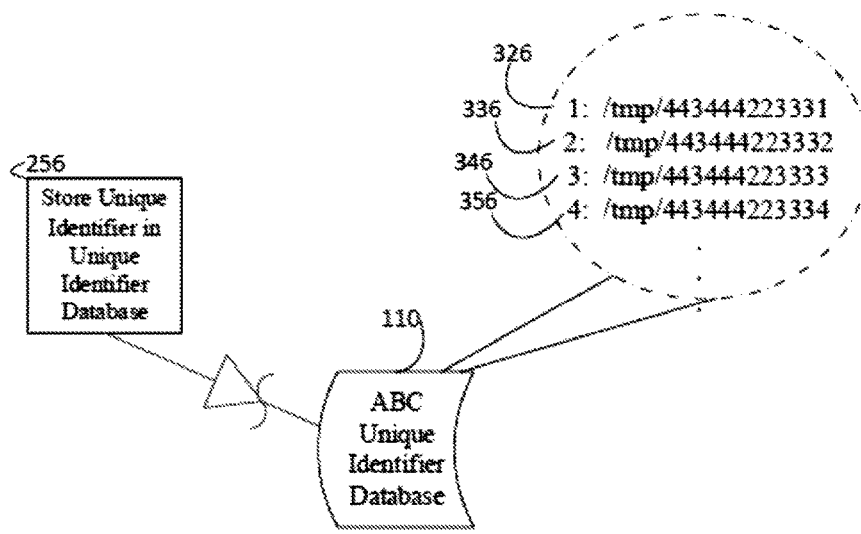
FIG. 3 is an illustration of several Unique Identifiers stored in an Unique Identifier Database according to the present invention.
Figure 5:
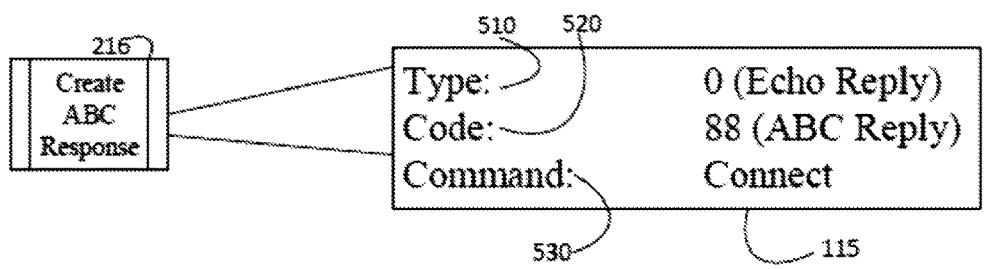
FIG. 5 is an illustration of an ABC Reply according to the present invention.

With continued reference to FIG. 2, and as indicated by a block 200, Server Software Module 108 comprises a set of code adapted to start operation of the software. Control is passed to block 202 where Server Software Module 108 comprises a set of code adapted to wait for a request (for example, ABC Request 125 from client machine 118 or a message from a technician or remote source 94 to add an Unique Identifier to Unique Identifier Database 110). Control is passed to a decisional block 254 where Server Software Module 108 comprises code adapted to determine if the request is to add an unique identifier to the Unique Identifier Database 110 (FIG. 3.). If the request is to add an unique identifier to Unique Identifier Database 110 then control is passed to a block 256 where Server Software Module 108 comprises code adapted to store an unique identifier 326 (corresponding to the unique identifier of the client machine sending the ABC Request) in Unique Identifier Database 110 which may be stored on storage device 106 of server machine 102 or on a remote storage device 90. FIG. 3 shows an Unique Identifier Database 110 having unique identifiers 326, 336, 346 and 356. Unique identifier 326 corresponds to unique identifier 126 of client machine 118. Unique identifier 336 corresponds to unique identifier 136 of client machine 128. Unique identifier 346 corresponds to unique identifier 146 of client machine 138. Control is then passed back to block 202 where server machine 102 waits for another request by the same or different machine. Returning to decisional block 254, if the request is not to add an unique identifier, control is passed to a decisional block 204 where Server Software Module 108 comprises code adapted to determine whether time out period T2 has expired. Timeout period T2 is a value used by the server machine to hold a request for a fixed set of time during which the Unique Identifier Database 110 will be tested for the presence of the Unique Identifier present in the current ABC Request. In the embodiment shown, hold period T2 is about 30 seconds. If time out period T2 has elapsed, then control is passed to block 212 wherein ABC Request 125 is dropped and control returns to block 202 where server machine 102 waits for another request by the same or different machine. If time out period T2 has not elapsed, then control is passed to a decisional block 206 where Server Software Module 108 comprises code adapted to determine whether unique identifier 430 of ABC Request 125 of client machine 118 is in Unique Identifier Data Base 110. If unique identifier 430 of ABC Request 125 of client machine 118 is not in Unique Identifier Data Base 110 control is passed to block 208 where Server Software Module 108 comprises code adapted to hold ABC Request 125 for a period of time or re-test period T3. In the embodiment shown, re-test period T3 is any desired amount of time. Control is returned to block 204 where code tests if time period T2 for this request has expired. Returning to decisional block 206, if the unique identifier 430 of the ABC Request 125 (FIG. 4) is in Unique Identifier Data Base 110 then control is passed to block 214 where Server Software Module 108 comprises code adapted to remove the unique identifier 430 from Unique Identifier Data Base 110. Control is then passed to block 216 where Server Software Module 108 comprises code adapted to create an ABC Reply 115 (FIG. 5) in reply to the ABC Request 125 from client machine 118. As shown by FIG. 5, ABC Reply 115 is a ICMP Echo Reply comprising a Type 510 equal to 0 (Echo Reply), a Code 520 equal to the value of Code 420 of ABC Request 125 that is being responded to, in this case 88 (which identifies this as an ABC Reply) and a command 530 that can be any command such as instructing client machine 118 to connect to a communication port (not shown) of server machine 102 or to download a software update. The unique value assigned to Code 520 of ABC Reply 115 is equal to the unique value of Code 420 assigned for ABC Request 125. Control is passed to block 218 where Server Software Module 108 comprises code adapted to send ABC Reply 115 to client machine 118. Specifically, ABC Reply 115 is passed by router 82 to Internet 80 and received by router 84 and passed to block 224 of Client Server Software Module 124 which, as previously described, comprises code adapted to receive ABC Reply 115. Control is returned to block 202 where server machine 102 waits for another message.

Example No 1

Maintaining a large network of server and client machines is a daunting task. For example, consider a company having 500 Linux based bar-code scanning devices (client machines 118, 128, 138, etc.) used at various locations around the world. A technician is responsible for monitoring the output of client machines 118, 128, and 138 and the other machines. In the present example, client machines 118, 128, and 138, and all the other machines are constantly creating and sending an ABC Request to the server machine 102. Each ABC Request has a unique identifier. At this state of our example, the unique identifier corresponding any client machine is not in Unique Identifier Database 110 and server machine 102 comprises code to see if a time period T2 has expired, for example 30 seconds, indicating that the server 108 has been holding ABC Request longer than the period T2. If hold period time T2 has not expired, Server Software Module 108 comprises code to wait a short re-test period time T3. After the re-test period time T3, Server Software Module 108 returns to the code testing if the unique identifier of the client machine is in Unique Identifier Database 110 before the expiration of hold period time T2. As stated before, at this state of our example, the unique identifier corresponding any client machine is not in Unique Identifier Database 110 and server machine 102 holds the ABC Request for each machine a period of time T2 and re-checks at intervals of time T3 and to ultimately drop the ABC Request if hold period time T2 expires until a need arises to enter an unique identifier for client machine 118, 128 or 138 or any other machine into the Unique Identifier Database 110. In this example, lets assume that the technician sees that client machine 118 is causing errors in the system and would like to connect to client machine 118. However, the technician cannot initiate a connection between server 102 and client machine 118 because client machine 118 is within a network with fire walls preventing the connection. With the present invention, the technician simply needs to send a command to server machine 102 to create an unique identifier for client machine 118 and store it in Unique Identifier Database. The next time the existing ABC Request (or in the case of a time out, a new ABC Request) for client machine 118 is processed, server machine 102 determines that the unique identifier corresponding to client machine 118 has been added to Unique Database 110. Server machine 102 then creates and sends an ABC Reply to client machine 118 in reply to the ABC Request sent by client machine 118. The ABC Reply contains a command 530 instructing the client machine 118 to take an action. In this example, the command is for client machine 118 is to connect to a port of server machine 102 so client machine 118 and server 102 can communicate with each other. Unlike conventional systems and methods, the present invention allows the technician to solve the problem without having to maintain an open connection between all the client machines (500 or more); sending a conventional ICMP request causing each client machine to constantly ping the server machine or causing a delay in the connection to a communication port of the server; or sending an http request to poll the server machine, all of which use a significant amount of bandwidth and system resources. The system and method of the present invention quickly solves the problem while using significantly less bandwidth and system resources than conventional systems and methods.

Example No. 2

This system and method of the present invention allows a software company to update millions of client software installs with a minimal server infrastructure by a process we have coined "trickle down software updates." A software company released a product on its server machine 102 and a million copies have been installed on machines around the world, including client machines 118, 128, and 138. The software needs to auto update when a new version is installed. However, the company doesn't want to invest in a robust server infrastructure that would support updating millions of clients simultaneously. The present invention solves this problem in the following way: (1) Client machines 118, 128, 138 or any other machine having a newly installed version of a software release sends a ABC Request 125 to an update server machine 102 with a defined timeout period; (2) The update server 102 has software that handles the ABC Requests. Instead of responding immediately to the ABC Requests the software holds the ABC Requests and waits for an unique identifier to be added to Unique Identifier Date Base 110 that matches an unique identifier in the ABC Requests sent by client machines 118, 128 or 138. In this case, the unique identifier could be a "flag" that is contained in the payload of every ABC Request send by client machines 118, 128, and 138 or any other machine having a newly installed software release; (3) After the timeout of the ABC Request, the Client Software Module 124 of client machine 118 or any other machine creates and sends another ABC Request with the same timeout period and unique identifier; (4) A software update is created and uploaded to update server 102; (5) A unique identifier, in this case a current flag, is set for a reasonable number of client machines, for example, one thousand client machines which includes client machine 118, and is added to Unique Identifier Date Base 110; (6) Because the flag corresponding to client machine 118 and other machines are stored in Unique Identifier Database 110 of update server 102, Server Software Module 108 creates and sends a ABC Reply to client machine 118 and any other machine having a flag that matches the current flag in the Unique identifier Database. The ABC Reply 115 contains a command to download an update; (7) When the ABC Reply 115 is received by client machine 118, Client Software 124 knows there is an update to be downloaded and immediately executes the command 530 contained in the ABC Reply 115 e; and (8) After the batch from step (5) above have been updated a new batch is started until all client machines have been updated. The system and method of the present invention allows a company to update many client machines with software without a need for a robust architecture by providing a simple and flexible system that maintains control of the client devices by the server machine.

The foregoing description is intended primarily for purposes of illustration. This invention may be embodied in other forms or carried out in other ways without departing from the spirit or scope of the invention.

What is claimed:

1. A system for communication over the internet comprising:
   a client machine in communication with the internet;
   a server machine in communication with the internet;

said client machine comprising a central processing unit, a storage device, and a Client Software Module stored on said storage device and executed on said central processing unit; said Client Software Module comprising a first set of code adapted to create an ABC Request; said ABC Request comprising an ICMP Echo Request type, a code having a unique value within the range of 1 to 255, an unique identifier and a time out period T1; said Client Software Module comprising a second set of code adapted to send said ABC Request to said server machine;

said server machine comprising a central processing unit, a storage device, a Server Software Module stored on said storage device and executed on said central processing unit, and an Unique Identifier Database;

said Server Software Module comprising a first set of code adapted to receive said ABC Request from said client machine; said Server Software Module comprising a second set of code adapted to determine whether said unique identifier of said ABC Request is in said Unique Identifier Database; said Server Software Module comprising a third set of code adapted to hold said ABC Request a hold time period T2 if said unique identifier is not in said Unique Identifier Database; said Server Software Module comprising a fourth set of code adapted to create an ABC Reply for said client machine after an unique identifier is added to said Unique Identifier Data Base that matches said unique identifier of said ABC Request before the expiration of hold time period T2; said ABC Reply comprising an ICMP Echo Reply type and a code equal to said unique value of said code of said ABC Request, and a command for said client machine; and said Server Software Module comprising a fifth set of code adapted to send said ABC Reply with said command to said client machine; said Server Software Module comprising a sixth set of code adapted to determine whether said time out period T1 of said ABC Request has expired; said Server Software Module comprising a seventh set of code adapted to drop said ABC Request if said time out period T1 has expired; and said Client Software Module of said client machine comprising a third set of code adapted to receive said ABC Reply from said server machine and execute said command and a fourth set of code adapted to send a new ABC Request if said ABC reply is not received from said server machine.

2. The system of claim 1, wherein said Server Software Module comprises an eighth set of code adapted to receive and store an unique identifier in said Unique Identifier Database.

3. The system of claim 2, wherein said Server Software Module comprises a ninth set of code adapted to create said ABC Reply.

4. The system of claim 3, wherein said Server Software Module comprises an tenth set of code adapted to delete said unique identifier from said Unique Identifier Database after said ABC Reply is sent to said client machine.

5. The system of claim 4, wherein said time out period T1 of said ABC Request is three minutes and said hold time period T2 of said Server Software Module is thirty seconds.

6. The system of claim 5, wherein said Unique Identifier Database is stored on said storage device of said server machine.

7. The system of claim 6, wherein said Server Software Module is stored on said storage device of said server machine and said Client Software Module is stored on said storage device of said client machine.

8. The system of claim 7, wherein said command comprises a command for said client machine to open a communication port with said server machine.

9. The system of claim 8, wherein said unique identifier of said ABC Request comprises a MAC address corresponding to said client machine.

10. A method for one or more client machines to communicate with a server machine over the internet, the method comprising the steps of:
(a) providing an Unique Identifier Data Base accessible by the server machine;
(b) creating an ABC Request comprising an ICMP Echo Request type, a code having an unique value in the range of 1 to 255, an unique identifier, and a time out period T1 on the client machine;
(c) sending the ABC Request to the server machine;
(d) receiving by the server machine of the ABC Request from the client machine;
(e) determining by the server machine whether the unique identifier of the ABC Request is in the Unique Identifier Data Base;
(f) holding by the server machine of the ABC Request a period of time T2 if the unique identifier of the client machine is not in the Unique Identifier Data Base;
(g) creating by the server machine an ABC Reply for said client machine after an unique identifier is added to said Unique Identifier Data Base that matches said unique identifier of said ABC Request before the expiration of hold time period T2; said ABC Reply comprising an ICMP Echo Reply type and a code equal to said unique value of said code of said ABC Request, and a command for said client machine;
(h) sending by the server machine of the ABC Reply to the client machine;
(i) execution by the client machine of the command of the ABC Reply if received from the server machine;
(j) determining whether the time out period T1 of the ABC Request has expired; and
(k) dropping the ABC Request if the time out period T1 of the ABC Request has expired; and
(l) sending a new ABC Request to the server machine if the ABC Reply is not received from said server.

11. The method of claim 10, further comprising the step of storing an unique identifier in the Unique Identifier Database identical to the unique identifier of the ABC Request.

12. The method of claim 11, further comprising the step of deleting the unique identifier from the Unique Identifier Database after the ABC Reply is sent to the client machine.

13. The system of claim 1, wherein said unique value of said code of said ABC Request is 88.

14. The method of claim 10, wherein said value of said code of said ABC Reply is 88.

* * * * *